(Model.)
J. LOCKE.
GLASS AND METHOD OF PRODUCING THE SAME.
No. 316,551. Patented Apr. 28, 1885.
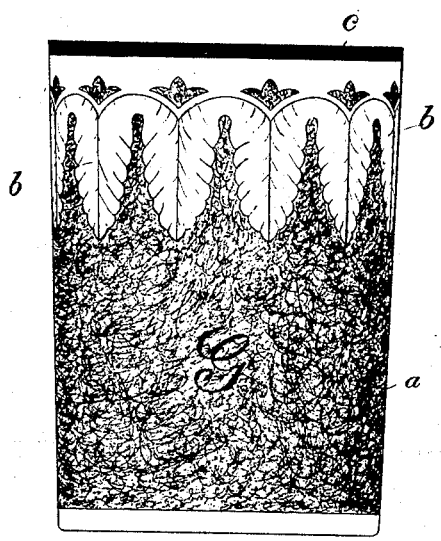
Witnesses.
John F. Nelson.
W. H. Segston
Inventor.
Joseph Locke
by Crosby & Gregory
Attys

United States Patent Office.

JOSEPH LOCKE, OF MEDFORD, ASSIGNOR TO E. D. LIBBEY, OF WINCHESTER, MASSACHUSETTS.

GLASS AND METHOD OF PRODUCING THE SAME.

SPECIFICATION forming part of Letters Patent No. 316,551, dated April 28, 1885.

Application filed January 23, 1885. (Model.)

*To all whom it may concern:*

Be it known that I, JOSEPH LOCKE, of Medford, county of Middlesex, and State of Massachusetts, have invented an Improvement in Glass and Method of Producing the Same, of which the following description, in connection with the accompanying drawing, is a specification, like letters on the drawing, representing like parts.

My invention has for its object the production from homogeneous glass of articles of glassware of great beauty, displaying most artistically not only simple but elaborate or diversified ornamentation in varied colors.

The drawing in elevation shows an article of glass embodying my invention.

In accordance with my invention the article of glassware to be produced is made and shaped from homogeneous glass in any usual way, after which it is covered with a wax or acid-resisting material, and the said wax or material, by a wheel or other suitable tool, is cut through, preferably in a series of curves, at that part of the article which is to constitute the groundwork, to outline the ornamentation or part which is to appear in color. The article of glass, with its coating cut through to the glass, is then subjected to the action of etching-acid, which eats into the glass wherever the wax or covering is removed, leaving a groundwork, *a*, and the ornamentation *b*. Preferably the etching of the groundwork will be such, when finished, as to present what is called an "iced" or "frosted" appearance, as at *a*. The article having been etched, the wax or acid-resisting material referred to is removed, and the parts to be displayed in color as ornamentation, as at *b c*, and in a color different from the natural color of the glass, will be painted or covered with a stain—as, for instance, if a yellow color is desired for the ornamental surfaces *b c*, they will be coated or painted with dilute nitrate of silver; but it will be understood that the material employed for the stain will or may be varied in accordance with the color it is desired to subsequently develop in the parts of the glass so painted or coated. After applying the stain, the article so prepared is carefully fired in a kiln, substantially such as used in enameling, and the color is developed on the parts painted or coated with the stain.

My improved glass, homogeneous or alike throughout, presents an etched surface in one color and an ornamental surface in another color, and differs materially from articles composed of glass of one color incased by glass of a different quality and color.

The outline of the ornamentation may be more or less elaborate.

I do not desire to limit my invention to any particular article to be made or produced in glass, as the same may be used for various purposes for which common white or flint glass is now commonly used, and yet afford ornamental effects in design and color.

I claim—

1. As an improved article of manufacture, glass homogeneous throughout and presenting an etched surface in one color and an ornamented surface in another color, substantially as described.

2. That improvement in the art of producing ornamental glass which consists in first etching a portion of the surface of the material, and then painting or covering portions of the article with a stain, and by firing developing the color on the painted or stained portions, substantially as described.

In testimony whereof I have signed my name to this specification in the presence of two subscribing witnesses.

JOSEPH LOCKE.

Witnesses:
G. W. GREGORY,
B. J. NOYES.